No. 686,255. Patented Nov. 12, 1901.
B. BROUGHTON.
TIRE FOR BICYCLES.
(Application filed Apr. 26, 1901.)
(No Model.)
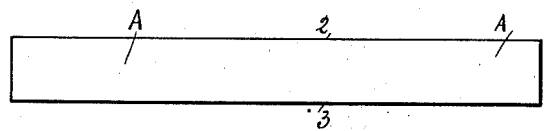
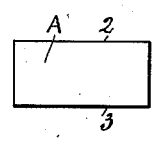
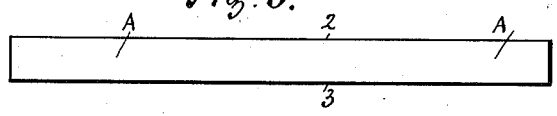
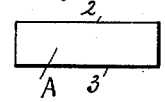
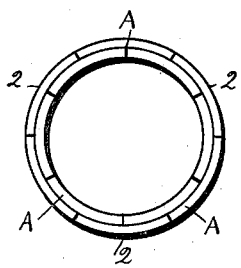
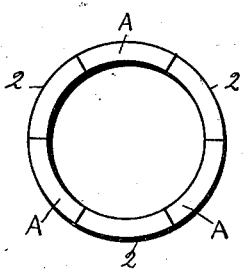
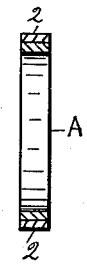
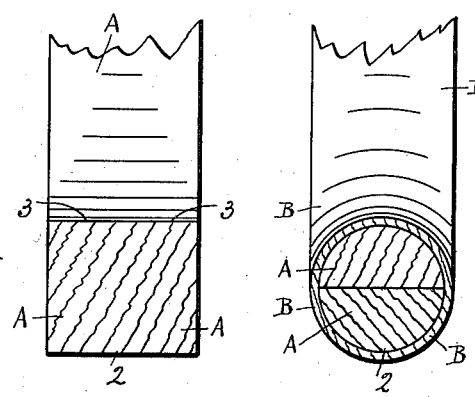
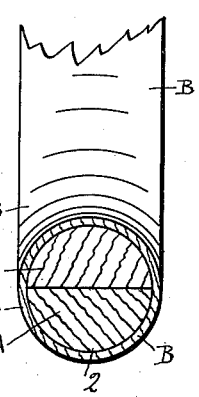
Witnesses.
B. E. Herald
Daniel McLaren
Inventor
Ben Broughton
John K. Hendry, Atty.

UNITED STATES PATENT OFFICE.

BEN BROUGHTON, OF HAMILTON, CANADA.

TIRE FOR BICYCLES.

SPECIFICATION forming part of Letters Patent No. 686,255, dated November 12, 1901.

Application filed April 26, 1901. Serial No. 57,627. (No model.)

*To all whom it may concern:*

Be it known that I, BEN BROUGHTON, a citizen of Canada, residing at Hamilton, in the county of Wentworth and Province of Ontario, Canada, have invented certain new and useful Improvements in Tires for Bicycles and the Like; and I do hereby declare the following to be a full, clear, and exact description of the invention, such as will enable others skilled in the art to which it appertains to make and use the same.

My invention relates to bicycle-wheel tires in which a length or lengths of cork is passed between revolving pressure-rollers to compress the cork at right angles with its grain to make the cork resilient. The cork is then formed and shaped into a tire-core, which is then completely covered with rubber vulcanized on said core.

The objects of my invention are, first, to provide a tire which shall possess inherent resiliency from the running-surface, and, second, to provide a tire which shall be comparatively light and durable and possessing the qualities of a pneumatic tire. I attain these objects by the device illustrated in the accompanying drawings, in which—

Figure 1 is a side elevation of a length of cork, the grain of which runs from end to end. Fig. 2 is an end elevation of the same. Fig. 3 is a side elevation of the same piece of cork as in Fig. 1 after the upper and lower surfaces have been rolled and compressed. Fig. 4 is an end elevation of the same. Fig. 5 is a reduced side elevation of a core, showing one manner of constructing the core with segmental lengths of cork in two layers overlapping each other and cemented together to form a ring. Fig. 6 is a similar view or modification showing the ring formed with single segments of cork, the ends of the segments secured to each other in any approved manner. Fig. 7 is a sectional front elevation of Fig. 5. Fig. 8 is a front sectional elevation of the core broken, this view showing one layer of cork; and Fig. 9 is a front sectional elevation of the tire after the ring has been shaped into a round ring or core and provided with a covering of rubber vulcanized thereto. Figs. 5, 6, 7, and 8 show the ring previous to the turning of the same in a lathe or otherwise shaping of the same to a proper section.

Similar characters refer to similar parts throughout the several views.

In the drawings a length or piece of cork is indicated by A, as in Figs. 1, 2, 3, and 4 of the drawings, and have upper surfaces 2 and lower surfaces 3. These surfaces 2 and 3 are rolled and compressed at right angles with the grain of the cork to give resiliency to the same. Figs. 3 and 4 of the drawings show the cork after being compressed, reduced in thickness—that is, from 2 to 3. This process of compressing the cork imparts inherent resiliency to said surfaces of the cork and prepares the same for the purpose intended. The surfaces 2 and 3 when compressed, as set forth, are of similar nature, and either one of said surfaces must of necessity form the outer base part or ground part of the core when the same is built in circular ring form.

Fig. 5 of the drawings shows one way of building the several lengths or segments of cork A into a ring, which may be built in a specially-adapted mold, the joints of the segments overlapping and the segments cemented together. Fig. 6 shows another way of building a ring of heavier material, the ends of the cork segments A abutting each other. These constructions shown in Figs. 5 and 6 of the drawings are not new. Other ways may be adopted; but the ones illustrated are preferable. It will be noticed that it is absolutely essential that either one of the rolled and compressed surfaces of the cork must form the outer base part or ground part 2 of the rings referred to.

After the segmental lengths of cork have been built and cemented together to form a ring the ring is then turned in a lathe or otherwise shaped to the desired shape or form of a core for a tire. The cork core is then covered by a rubber covering B, which is securely vulcanized to and thereon. The cork and rubber tire will then be atmospheric and weather-proof.

Having now particularly described and ascertained the nature of my said invention and in what manner the same is to be performed, what I claim as my invention, and desire to secure by Letters Patent, is—

1. A tire consisting of a cork core, two opposite surfaces of the cork treated by pressure-rollers and compressed at right angles to the grain of the cork, and previous to the shaping of the cork into a ring, and a rubber envelop or cover vulcanized thereto, substantially as and for the purpose set forth.

2. In a cork tire, lengths of cork rolled between pressure-rollers and compressed at right angles to the grain of the cork, to afford inherent resiliency to the cork, said compressed lengths of cork built and cemented together into a ring, and shaped to form a tire-core, and a rubber envelop or cover vulcanized thereto, substantially as and for the purpose set forth.

3. In a wheel-tire, sections or segments of cork, said sections or segments compressed at right angles to the grain thereof to afford resiliency to the cork, said compressed sections or segments built and cemented together into a ring, said ring shaped to form a tire-core, said core completely covered with rubber, said rubber covering vulcanized to said core to form a tire, substantially as and for the purpose set forth.

In testimony whereof I affix my signature in presence of two witnesses.

BEN BROUGHTON.

Witnesses:
 JOHN H. HENDRY,
 B. E. HERALD.